United States Patent
Coenen et al.

(10) Patent No.: US 11,687,759 B2
(45) Date of Patent: Jun. 27, 2023

(54) NEURAL NETWORK ACCELERATOR

(71) Applicant: SEMICONDUCTOR COMPONENTS INDUSTRIES, LLC, Phoenix, AZ (US)

(72) Inventors: Ivo Leonardus Coenen, Coffrane (CH); Dennis Wayne Mitchler, Marin-Epagnier (CH)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 951 days.

(21) Appl. No.: 16/385,192

(22) Filed: Apr. 16, 2019

(65) Prior Publication Data

US 2019/0340493 A1 Nov. 7, 2019

Related U.S. Application Data

(60) Provisional application No. 62/665,318, filed on May 1, 2018.

(51) Int. Cl.
*G06N 3/04* (2023.01)
*G06N 3/08* (2023.01)

(52) U.S. Cl.
CPC ............... *G06N 3/04* (2013.01); *G06N 3/08* (2013.01)

(58) Field of Classification Search
CPC ............ G06N 3/04; G06N 3/08; G06N 3/082; G06N 3/063
See application file for complete search history.

(56) References Cited

U.S. PATENT DOCUMENTS

| | | | |
|---|---|---|---|
| 2015/0199963 A1 | 7/2015 | Maaninen | |
| 2016/0322042 A1* | 11/2016 | Vlietinck | G10L 15/16 |
| 2016/0379109 A1 | 12/2016 | Chung et al. | |
| 2017/0102950 A1* | 4/2017 | Chamberlain | G06N 20/00 |
| 2017/0277658 A1* | 9/2017 | Pratas | G06F 12/0875 |
| 2018/0005111 A1* | 1/2018 | Chaudhari | G06N 3/0481 |
| 2018/0082181 A1* | 3/2018 | Brothers | G06N 3/082 |
| 2018/0121796 A1* | 5/2018 | Deisher | G06N 3/0472 |
| 2018/0164866 A1 | 6/2018 | Turakhia et al. | |

(Continued)

FOREIGN PATENT DOCUMENTS

| | | |
|---|---|---|
| CN | 104915322 A | 9/2015 |
| CN | 105488565 A | 4/2016 |

(Continued)

OTHER PUBLICATIONS

Gao, Chang, et al. "DeltaRNN: A power-efficient recurrent neural network accelerator." Proceedings of the 2018 ACM/SIGDA International Symposium on Field-Programmable Gate Arrays. Feb. 15, 2018. (Year: 2018).*

*Primary Examiner* — Kamran Afshar
*Assistant Examiner* — Ryan C Vaughn
(74) *Attorney, Agent, or Firm* — Brake Hughes Bellermann LLP

(57) ABSTRACT

A neural network implementation is disclosed. The implementation allows the computations for the neural network to be performed on either an accelerator or a processor. The accelerator and the processor share a memory and communicate over a bus to perform the computations and to share data. The implementation uses weight compression and pruning, as well as parallel processing, to reduce computing, storage, and power requirements.

10 Claims, 7 Drawing Sheets

(56) References Cited

U.S. PATENT DOCUMENTS

2018/0330235 A1\* 11/2018 Lin ................... G06N 3/063
2019/0187898 A1\* 6/2019 Gu ..................... G06N 3/08
2019/0311243 A1\* 10/2019 Whatmough ......... G06N 3/063

FOREIGN PATENT DOCUMENTS

| CN | 106529670 A | | 3/2017 | |
|---|---|---|---|---|
| EP | 0517429 A2 | \* | 5/1992 | ........... G06F 9/3877 |
| JP | 2000308198 A | \* | 11/2000 | ........... G09B 21/009 |
| TW | 201734894 A | | 10/2017 | |
| WO | 20170124644 A1 | | 7/2017 | |

\* cited by examiner

NEURAL NETWORK ACCELERATOR

CROSS-REFERENCE TO RELATED APPLICATION

This application claims the benefit of U.S. Provisional Application No. 62/665,318, filed May 1, 2018, and entitled, "NEURAL NETWORK ACCELERATOR," which is hereby incorporated by reference in its entirety.

FIELD OF THE DISCLOSURE

The present disclosure relates to systems for neural networks and more specifically to a neural network implementation on a system on a chip.

BACKGROUND

Neural networks are tools of artificial intelligence that may be used in a digital signal processing application using a processor or a digital signal processor (DSP) to perform a complex recognition function. The processor can be configured by software instructions to compute (i.e., process) a neural network but may be too slow for many real-time applications, such as speech recognition. The DSP can be a specialized microprocessor with architecture optimized for repeatedly running an algorithm in real-time with received data. The DSP may use fewer resources (e.g., power and memory) than the processor (e.g., ARM processor) for a computing device, but may consume too much power for low power applications. A need, therefore, exists for new hardware and software systems to perform neural network processing with improved speed and lower power consumption.

SUMMARY

The present disclosure generally describes an approach for computing a neural network. The disclosed approach uses an accelerator and a host processor (i.e., processor), which share resources, such as a bus and a memory, so that various operations of the computation, such as applying an activation function, may be performed in either hardware (i.e., on the accelerator) or in software (i.e., running on the processor). The disclosed approach also saves memory and power by reducing the amount of data used to represent the weights of the neural network (i.e., resulting from training). The reduction results from pruning weights that are effectively zero (e.g., having a value below a threshold) and storing the remaining weights in a compressed form. Accordingly, the disclosed accelerator is configured to decompress the compressed weights using a (e.g., 4-bit to 8-bit) lookup table. The disclosed approach also saves power by computing portions of the neural network in parallel and keeping the input data stable during the computations. Holding the input data stable also reduces fetching operations to save power.

In one general aspect, the disclosure describes a method for implementing a neural network. The method includes receiving input data and fetching, from a memory, weights (e.g., compressed weights, weights including compressed weights, or uncompressed weights) of the neural network. The method also includes performing a first portion of processing for the neural network. The first portion of the processing is implemented in hardware by an accelerator. The method also includes performing a second portion of processing for the neural network. The second portion of the processing is implemented in software by a processor. In the method, the accelerator and the processor use a bus to communicate and to share access to the memory.

In another general aspect, the disclosure describes a neural network system. The system includes a memory configured to store compressed weights of a neural network. The system also includes a processor data bus coupled between the memory and a processor. The system also includes an accelerator that is coupled to and that shares the processor data bus with the processor. The accelerator is configured to fetch and decompress the compressed weights of the neural network from the memory and to perform at least a portion of the processing for the neural network while the processor performs other tasks. The portion of the processing includes a plurality of multiply and accumulate (MAC) operations that are performed in parallel.

In another general aspect, the disclosure describes an accelerator for implementing a neural network. The accelerator includes a plurality of multiply and accumulate (MAC) units operating in parallel. Each MAC unit is configured to repetitively multiply an input value and a weight to accumulate a full sum of products representing a value corresponding to a neuron in the neural network. The accelerator also includes a lookup table for decompressing compressed weights stored in a memory to produce the weight for each MAC unit at each repetition. The accelerator also includes a circular buffer that feeds the input value to each unit at each repetition.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
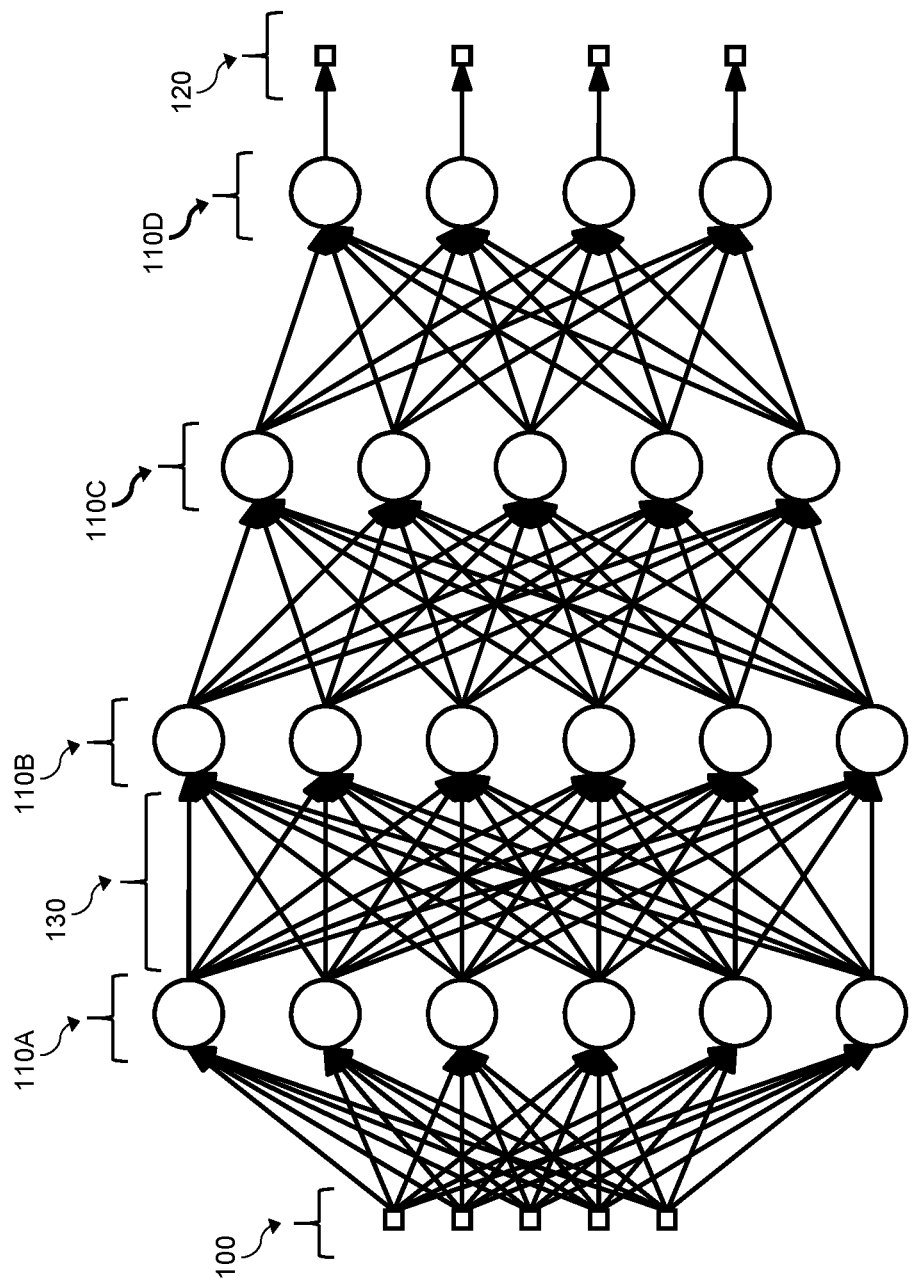
FIG. 1 is a graphical depiction of an example neural network that can be used herein.

The disclosure generally describes an apparatus configured to implement a neural network for mobile applications (e.g., hearing aids) to improve speech recognition (e.g., voice commands) or sound recognition (e.g., background noise types) in a power efficient way (e.g., to conserve battery life). The apparatus includes an accelerator that is a semiconductor (i.e., hardware) platform (i.e., block) that aids a processor in implementing an artificial intelligence (AI) algorithm (e.g., neural network). The accelerator includes hard coded logic and mathematical functions that can be controlled (e.g., by a state machine configured by a processor) to process a neural network. The accelerator can process the neural network faster and more (power) efficiently than conventional software running on, for example, a DSP. A DSP approach may require additional processing/power resources to fetch software instructions, perform computations in series, and perform computations using a bit depth that is much higher than may be desirable for a particular application (e.g., hearing aid). Instead, the disclosed accelerator avoids fetching of software instructions, performs processing (e.g., computations) in parallel, and processes using a bit depth for a neural network suitable for a particular application (e.g., a hearing aid).

In a possible application, a neural network may require more than 200,000 cycles to obtain an output, and an output must be obtained every 10 milliseconds (ms). These requirements could result in clock speeds of around 20 megahertz, which is too high for a typical low power DSP for a hearing aid. The disclosed approach provides an apparatus and method to implement a neural network in applications with the same (or similar) requirements, enabling these applications to be small in size and low power.

One feature of the disclosed approach is that the use of an accelerator allows the neural network processing to be performed in either software (i.e., running on a processor) or in hardware (i.e., in the accelerator) to promote versatility. An accelerator may be generally described as dedicated logic on a chip (i.e., a hardware block) that performs a specialized set of functions that are more efficient (e.g., faster) than performed on an instruction set processor (i.e., as software running on a processor).

Another feature of the disclosed approach is that the accelerator and the processor may share the resources (e.g., a bus and a memory) to conserve time, complexity, and cost. Another feature of the disclosed approach is that the accelerator facilitates techniques (e.g., synapse weight compression and synapse pruning) to conserve memory and processing. Another feature of the disclosed approach is that the accelerator facilitates parallelism (e.g., a plurality of multiply and accumulate units and circular buffers) to conserve power.

The neural network accelerator may be implemented as part of a hearing aid. The hearing aid may utilize the neural network to improve recognition of commands spoken by a user. Based on a recognized command (e.g., volume up), the hearing aid may perform a function (e.g., increase volume). Additionally, or alternatively, the hearing aid may utilize the neural network to improve recognition of a background environment. Based on a recognized environment, the hearing aid may (automatically) perform a function (e.g., change a noise cancellation setting). The use of the accelerator may decrease a power consumption required for computing the neural network, which may be required frequently for the hearing aid scenarios described. The reduced power is advantageous for hearing aids, which require small sizes and long operating lifetimes.

A graphical depiction of an example neural network that can be implemented herein is shown in FIG. 1. The neural network includes a set of computational processes for receiving a set of inputs 100 (i.e., input values) and returning a set of outputs 120 (i.e., output values). Neural networks may be applied to artificial intelligence recognition problems where each output 120 represents a possible recognition (e.g., machine recognition of speech commands or image identification). In this case, the output 120 with the highest value represents the recognition that is most likely to correspond to the input. For example, each output 120 may represent a speech command and each input may represent speech. For example, audio samples transformed to a frequency domain and stored in a circular input buffer may be fed into the neural network for each frame (e.g., 10 milliseconds) of audio data. In other words, the circular buffer can hold the audio length on which the neural network is run (e.g., 0.4 to 2 seconds). When the input speech causes an output to exceed a threshold value, then the speech may be recognized as a speech command, which may, in turn, trigger additional functions in a larger system.

The neural network includes layers 110A, 110B, 110C, 110D made up of artificial neurons (e.g., represented as circles). For brevity, artificial neurons will be referred to simply as neurons in the disclosure. As an analog to a biological neuron, each neuron has a value corresponding to the neuron's activity (i.e., activation value). The activation value can be, for example, a value between 0 and 1 or a value between −1 and +1. The value for each neuron (i.e., node) is determined by a collection of synapses 130 (i.e., arrows) that couple each neuron to other neurons in a previous layer. The value for a given neuron is related to an accumulated, weighted sum of all neurons in a previous layer. In other words, the value of each neuron in a first layer is multiplied by a corresponding synapse weight and these values are summed together to help compute the activation value of a neuron in a second layer. Additionally, a bias may be added to the sum to help adjust an overall activity of a neuron. Further, the sum including the bias may be applied to an activation function, which maps the sum to a range (e.g., zero to 1). Possible activation functions may include (but are not limited to) rectified linear unit (ReLu), sigmoid, or hyperbolic tangent (TanH).

A neural network is trained for recognition before being implemented in an application. Additionally, the training of the neural network may be updated based on heuristic data collected during an implementation. The training results in a set of weights for synapses and biases for a final neuron accumulation. A relatively large amount of memory may be required to store the weights of each synapse and the bias for each node. For example, a neural network with more than 100,000 synapses may require 100 kilobytes (kB) of memory assuming 8-bit weights, which is large for devices with a small memory capacity such as hearing aids. Some of the weights may be eliminated to conserve memory. For example, a first neuron value multiplied by a very low weight will have little impact on the accumulated sum even if the first neuron value is very high (i.e., even if the first neuron is highly active). In some cases, these low weighted synapses may be pruned from the neural network without significantly reducing the accuracy of the neural network. This pruning can save processing (e.g., multiplications, additions) and memory requirements. In some implementations, 90% of the weights can be pruned without a significant (e.g., any) loss of accuracy. The techniques and hardware disclosed herein support using pruned neural networks.

The weights may be compressed with a compression scheme to allow for efficient storage. The accelerator supports non-linear compressed weights through a built-in programmable lookup table that can expand the compressed weights (e.g., 4-bit to 8-bit expansion). Weights with zero values may be encoded as a single bit (e.g., 0), while non-zero weights can be encoded with an additional header bit (e.g., 1). One example of a compression scheme may be represented as 0=pruned weight (expands to 0x00), and xxxxxxxx1=non-pruned weight (in 8-bit mode, 4-bit mode may be xxxx1). An entire bit stream may be packed together, starting at a 32-bit boundary in memory. The bit stream may be read in-32 bit words from memory, decoded and in some cases of 4 bit weights expanded to 8 bits. While the above details one example of a compression scheme, other embodiments may use a modified version of the example compression scheme or an entirely different compression scheme.

Even a modest neural network can require a high number of cycles to compute (e.g., in software running on a processor). Additionally, an application may require that the neural network be implemented multiple (e.g., 100) times a second. An increase in cycle speed to accommodate the large number of required operations corresponds to an increase in power. The clock speeds for some mobile applications, however, may be restrained to a low rate (e.g., less than 20 MHz) to conserve power. While a digital signal processor (DSP) could be used for the processing, the DSP is generally configured for high precision (e.g., 24 bit, 32 bit). Processing the neural network, however, may require much less precision. In this case, the added precision of the DSP is wasteful of power. The disclosed circuits and techniques can offer an advantage over a DSP implementation because may achieve more processing per cycle and use less precision to save power without a loss in accuracy.

Neural networks (e.g., deep neural networks) may require a very large number of operations (e.g., between 10 and 100 thousand) to reach a conclusion. What is more, a neural network may require reaching many computations per second in order to respond to a stream of input data. The approaches disclosed herein can be advantageous over, for example, a DSP running a neural network algorithm that may require a very fast clock (i.e., high number of clock cycles) to perform neural network algorithm processing in real time. The disclosed approaches can also be advantageous over a DSP that may consume too much power for some applications. The disclosed approaches can be advantageous over other approaches that limit power consumption by limiting the size of the neural network, thereby limiting the performance (e.g., power of recognition) of the neural network.

Figure 2:
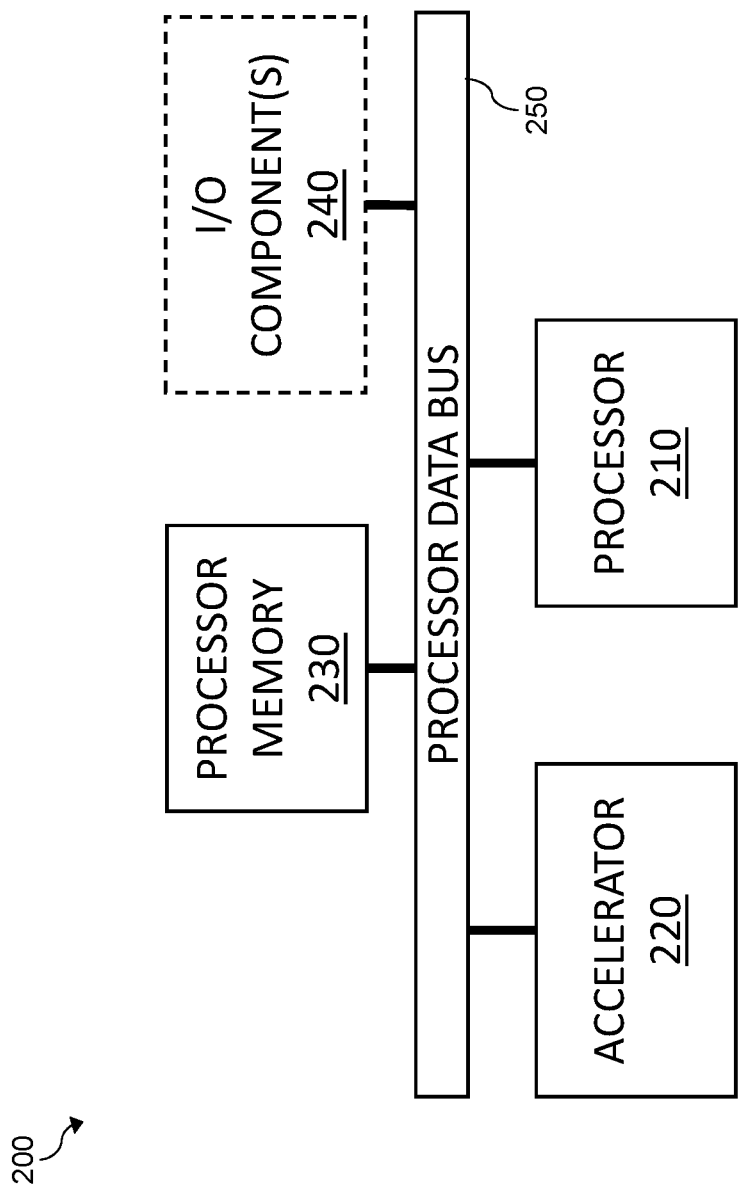
FIG. 2 is a block diagram of a neural network system according to an implementation of the present disclosure.

A block diagram of a SOC implementation of a neural network system is shown in FIG. 2. The aspects shown in FIG. 1 can be computed using the SOC of FIG. 2. The neural network system is configured to receive input values from input/output (I/O) components 240 (e.g., microphone) and to recognize the input values by processing a neural network trained to recognize particular input values as having particular meanings. For example, the input values may be Mel-frequency cepstral coefficients (MFCC) generated from an audio stream. In one possible implementation, frames audio samples are taken regularly (e.g., every 10 milliseconds) and are transformed to a frequency domain for input to the neural network.

The neural network system 200 includes a processor 210 (i.e., host processor) that is coupled to a processor data bus (i.e., processor bus, data bus, bus) 250. The processor 210 may perform a portion (e.g., none, part) of the processing for the neural network via software running on the processor 210. The system 200 also includes a processor memory (i.e., memory) 230 that is coupled to the processor data bus 250 and that stores the trained weights for the synapses (i.e., weights) of the neural network. The system 200 also includes an accelerator 220 coupled to the processor data bus 250.

The accelerator may perform a portion (e.g., all, part) of the processing for the neural network. The accelerator can (in some implementations) use the same processor data bus 250 and the same processor memory 230 as the host processor (e.g., ARM processor) 210. The accelerator may use the processor data bus when it is not in use by the host processor. For implementations in which tasks (e.g., computations) of the neural network are split between the accelerator and the processor, the accelerator may trigger the processor to perform a task by generating an interrupt. Upon receiving the interrupt, the processor 210 may read input values from the (shared) processor memory 230, perform the task, write the results to the processor memory 230, and return control to (i.e., restart) the accelerator 220.

Figure 3:
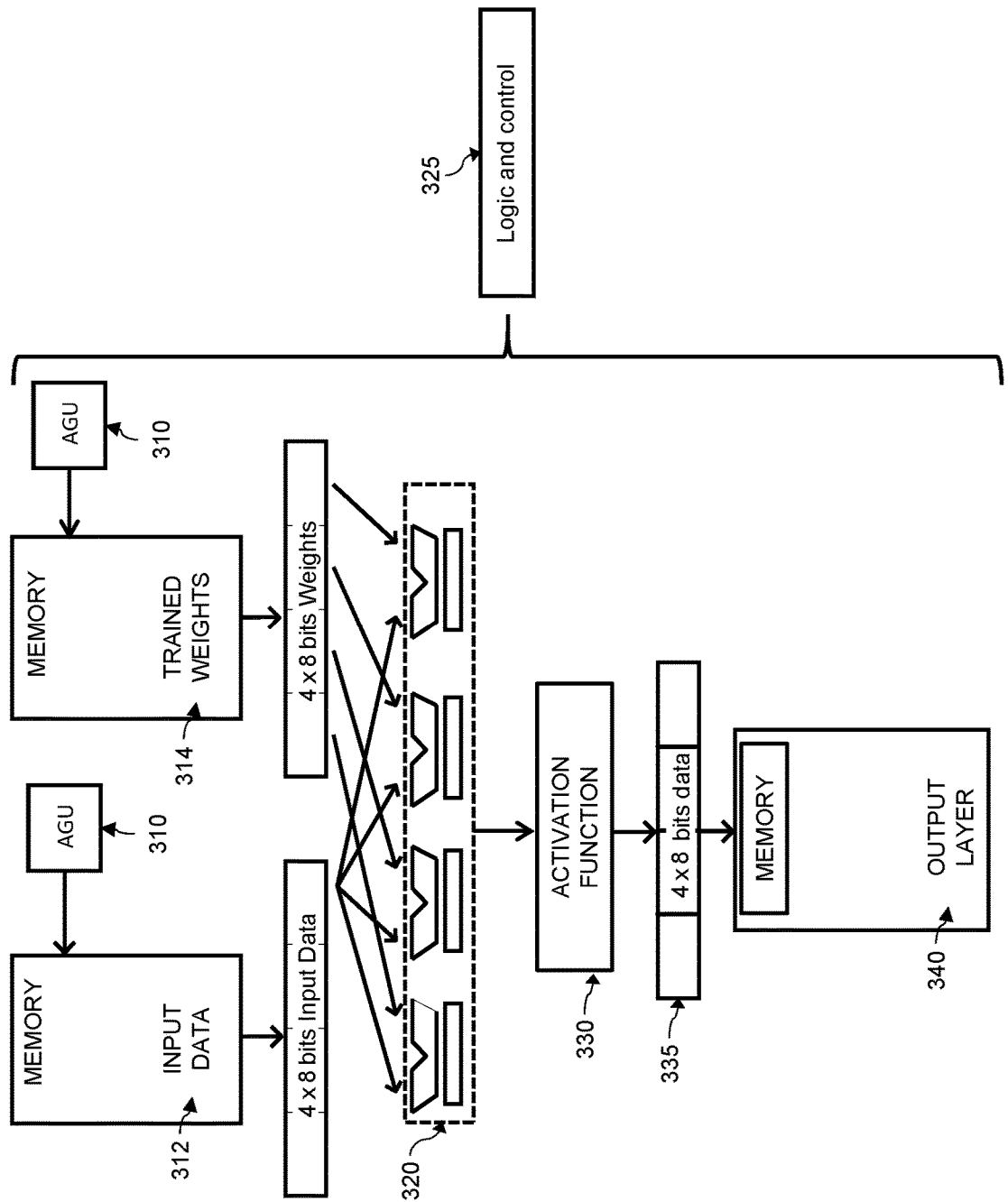
FIG. 3 is a hardware block diagram of an accelerator for a neural network according to a possible implementation of the present disclosure.

A hardware block diagram of a general implementation of accelerator is shown in FIG. 3. A memory may be accessed by an address generation unit 310 to obtain the input data 312 (e.g., MFCC values generated from an audio stream) and the weights of the neural network resulting from training (i.e., the trained weights 314). The weights may be 8 bit or 4 bit using a programmable, or fixed, 4-to-8-bit lookup table (e.g., to allow for example logarithmic distribution of the available weights, as in a-law and μ-law audio codecs); however, other embodiments may use different sized weights. The input data and the trained weights, which may be 8 bits in length, are fed (e.g., four at a time) into an array of four (8 bit) multiplier-accumulator (MAC) units 320. Logic and control 325 is used to manage the building and computing the sum of neuron and synapse weight products using the MAC units. Next, an activation function 330 (e.g., ReLu, sigmoid, TanH, etc.) is applied to map the sum to a range. While not shown, a bias could be fetched and added in front of the activation function. The activation values for nodes in the output layer 340 of the neural network are (8 bit) values and are buffered (e.g., four at a time) into the memory.

The accelerator can process large neural networks very quickly because of its use of parallel MAC units 320, which can accommodate a very large number of MAC operations. For example, a neural network that may be computed using the disclosed approach may have 680 nodes in an input layer and 64 nodes in an output layer. Additionally, the neural network may have three hidden layers, each having 256 nodes. A single processing of this neural network to obtain an output may require a total of 321,536 MAC operations.

In the implementation shown in FIG. 3, four neurons are processed each cycle by multiplying an input with four different weights to generate four synapses. On the next cycle, the input and weights are changed. The new inputs and weights are multiplied and accumulated with the results of the previous cycle. This is not a low power approach because the inputs and weights can change cycle to cycle, which consumes power. The disclosed accelerator consumes less power by holding the inputs stable while the weights are changed between cycles.

Figure 4:
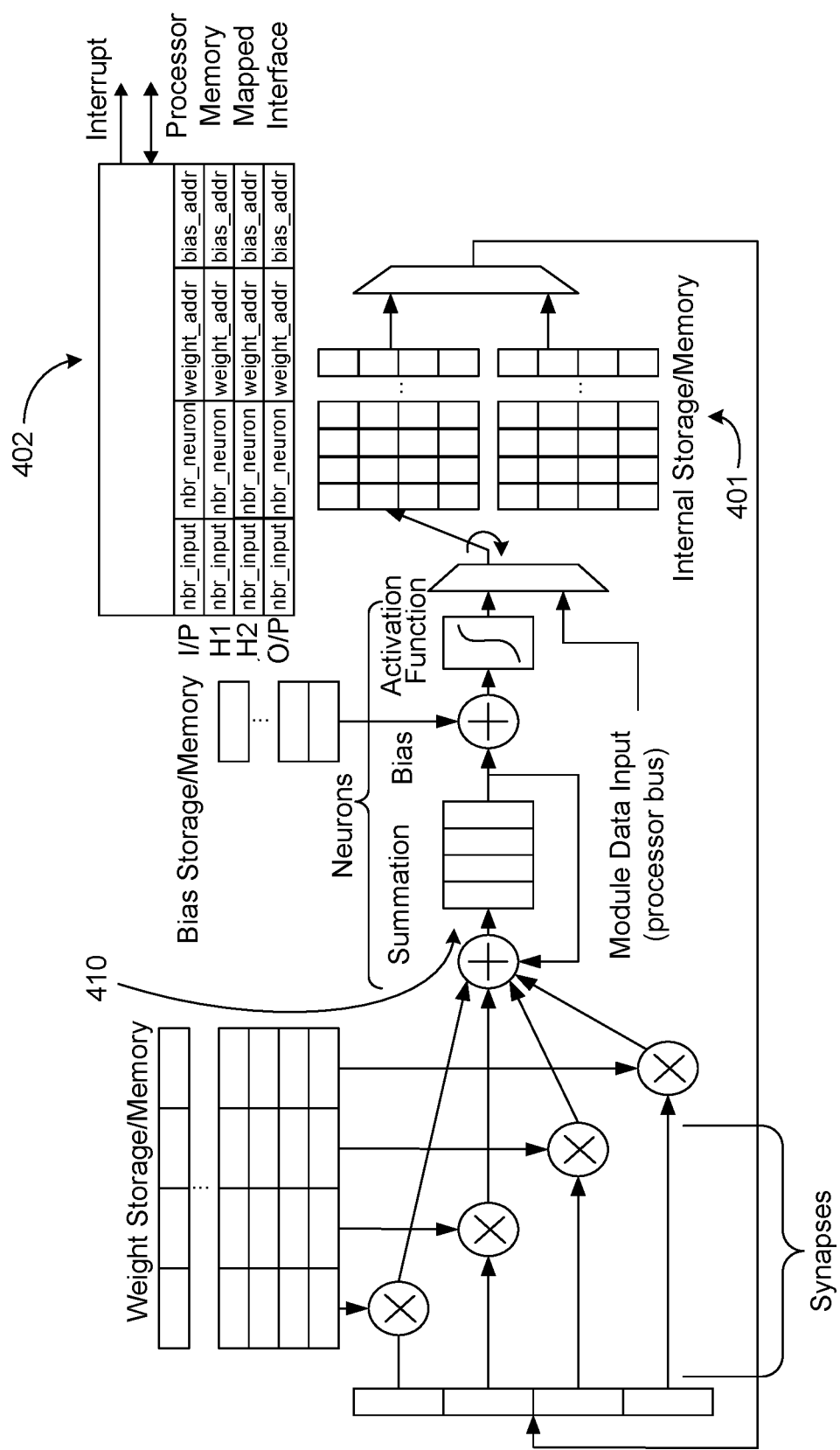
FIG. 4 is a functional block diagram of a possible stand-alone implementation of an accelerator for a neural network.
Figure 5:
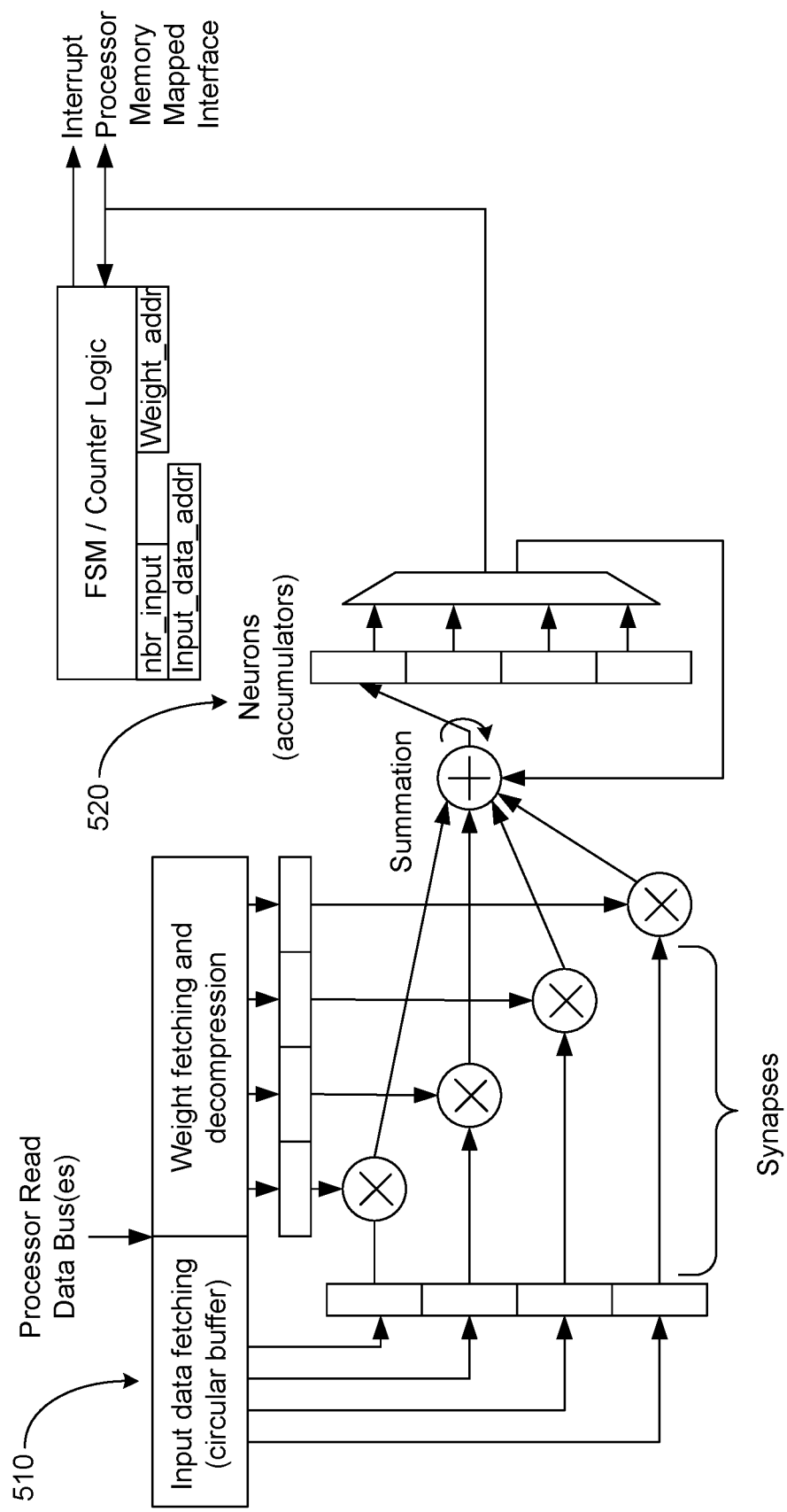
FIG. 5 is a functional block diagram of a possible implementation of an accelerator for a neural network in which the activation function is implemented in software.
Figure 6:
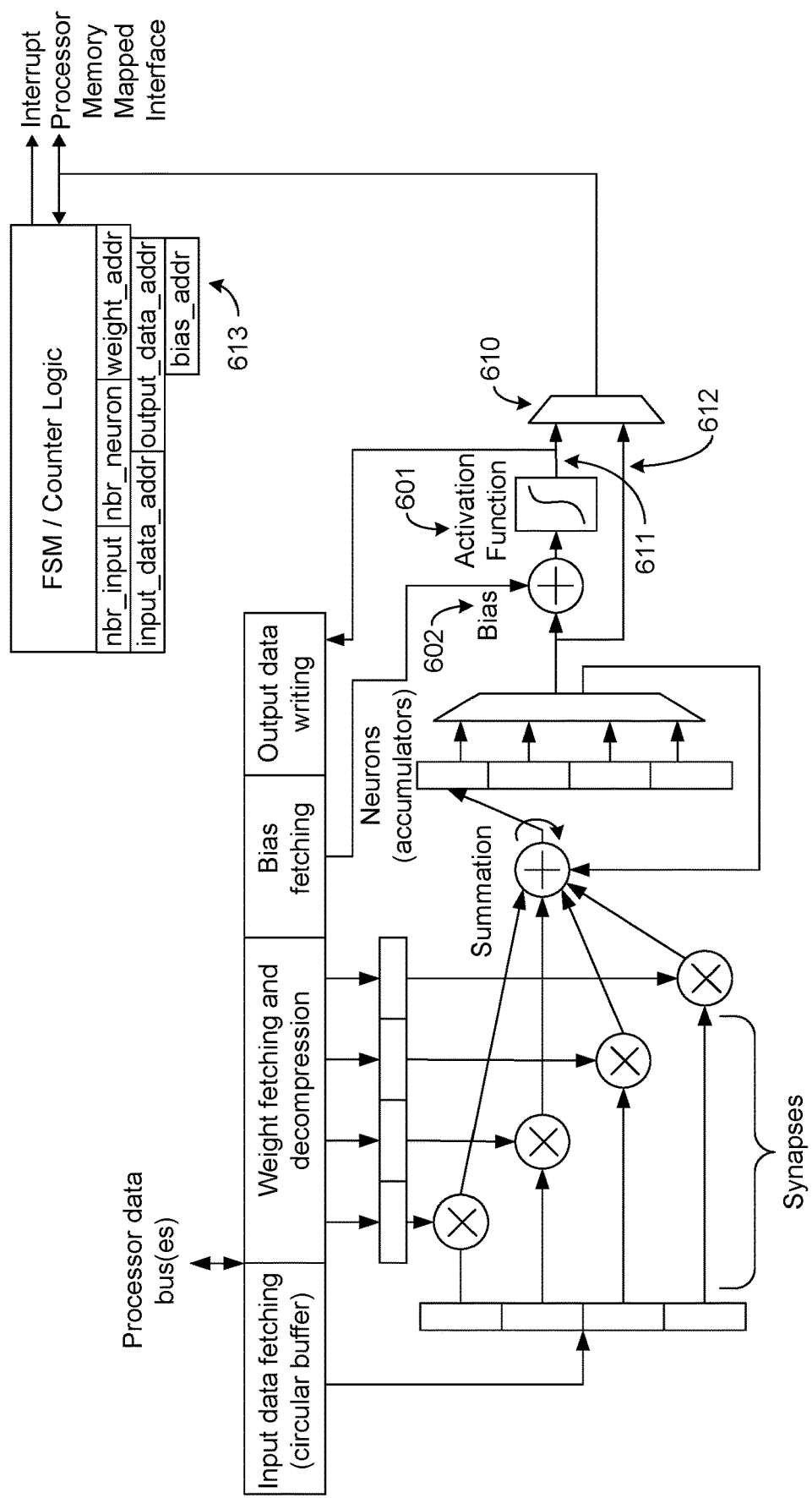
FIG. 6 is a functional block diagram of a possible implementation of an accelerator for a neural network in which the activation function can be implemented in hardware or software.

In what follows (i.e., FIGS. 4-6), some possible implementations for the accelerator are presented. The possible implementations all interact with the processor but differ in the amount of the neural network processing that is performed by the accelerator versus the amount performed by software running on a processor. FIG. 4 generally illustrates a possible implementation in which the vast majority of the processing is performed by the accelerator, with only an initial configuration provided by the processor. FIG. 5 illustrates a possible implementation in which much of the processing is performed in software running on the processor. FIG. 6 illustrates a possible implementation in which the portion of the processing performed by software running on the processor is adjustable.

FIG. 4 illustrates a possible implementation of the accelerator. The possible accelerator implementation is a standalone implementation because it has internal memories 401 and finite state machine (FSM). A processor can configure the FSM with parameters and/or control logic for processing the neural network, such as number of inputs (nbr_input), number of neurons (nbr_neuron), weight memory address (weight_addr), input data memory address (input_data_addr), output data memory address (output_data_addr) and bias memory address (bias_addr). After the configuration of the FSM is complete, the standalone implementation of FIG. 4 may require no further interaction with the processor (or the processor bus or processor memory). In a possible implementation, however, the accelerator may communicate a result of the neural network to the processor.

The standalone accelerator implementation of FIG. 4 includes a shift register 410 to store the temporary output of the MACs, one per neuron. The shift register is shown as having four register locations, which is the same number as the number of synapse multiplications. The number of register locations, however, is not generally constrained to the number of synapse multiplications.

The operation of the possible accelerator implementation of FIG. 4 generally includes the processing of multiple neurons (e.g., four as shown) over multiple synapses (i.e., weights). In the first cycle, four synapses associated with a first neuron are multiplied with four inputs (e.g., layer inputs) and the sum is stored in one of the registers of a shift register 410. In the next cycle, a different set of synapses associated with a second neuron is multiplied with the (same) four inputs and the accumulated sum is stored in the next register of the shift register 410. This process is repeated until all registers are written. Once all registers are written, a new set of four inputs for the first neuron are obtained, multiplied by weights, and accumulated with the previously stored register value. The process is continued until each node in the layer is computed. At this point, a bias and an activation function are applied to the node value before being stored in an internal storage/memory 401.

In the possible implementation of FIG. 4, four synapse multiplications are performed per cycle, allowing for data to be packed into 32-bit words when using 8-bit arithmetic. The shift register bank 410 holds the input stationary for multiple (e.g., 4) cycles because multiple (e.g., 4) neurons are processed per pass. Holding the input data stable reduces bus traffic (i.e., power consumption). The implementation includes a finite state machine (FSM) and counters controlled by a configuration register provided (e.g., by the processor) for each layer of the neural network.

FIG. 5 illustrates a possible implementation of the accelerator in which the activation function and the bias are applied to each node in software running on the processor. Accordingly, this implementation of the accelerator includes accessing shared memory over the shared (processor) bus.

The implementation of FIG. 5 includes a circular register bank (i.e., circular buffer 510) to feed the neural network samples from streaming data in a time windowed manner. The processing of neurons four inputs at a time proceeds as described for the possible implementation of FIG. 4 with the exception that a rotating register 520 is used instead of the shift register 410.

After each neuron is computed, an interrupt is generated and sent to the host processor. The processor reads the accumulated neuron values, adds the bias, and performs the activation function. For example, a rectified linear unit (ReLu) may be accomplished in two cycles through minimum (i.e., min) and maximum (i.e., max) instructions. The resulting neuron values are stored in memory and used as the inputs for the next layer of the neural network. For each layer the processor starts the accelerator until the entire neural network is processed.

FIG. 6 illustrates a possible implementation of the accelerator in which the activation function may be implemented in hardware or software. Compared to the implementation shown in FIG. 4, the implementation shown in FIG. 6 has no internal memory to store the outputs of a layer. Instead, the outputs are stored in a memory of the processor. Compared to the implementation shown in FIG. 5, there is a look up table (LUT) 601 that implements the activation function and an adder 602 for computing the bias. This implementation of the accelerator allows for software to control the neural network processing and either hardware or software to apply the activation function. The application of the activation function is configurable by selecting one of the inputs to a multiplexor 610. The upper input 611 of the multiplexor 610 is selected when using hardware and the bottom input 612 of the multiplexor 610 is selected when using software. When the activation function is applied in hardware, a write back of activation values is possible and a whole layer can be processed without interaction with the host processor. In operation, a bias may be fetched from memory and adding the bias to the accumulated sum. Then, the activation function may be performed in hardware and the resulting neuron values are stored in memory. This process may repeat for other neurons in the layer. After a configured amount of neurons have been processed and stored, an interrupt can be generated for the host processor. Upon receiving the interrupt and after updating the configuration registers 613, the processor can restart the accelerator again for the next layer and the process repeats until the complete neural network has been processed.

The accelerator can use the processor data bus(es) to access the memory (e.g., to access the input data, the weights, and the output data) when it is not used by the host processor. To increase the speed of the processing the number of parallel MAC units may be increased. This increase however implies that more weights need to be fetched per cycle from memory, and fetching too many weights can become a bottleneck in the process. Weight compression reduces the amount of data fetched per cycle and can facilitate an increase in the number of parallel MAC units that may be implemented, which increases the overall processing speed. Input data must also be fetched and the input data fetching can limit the weight data fetching. To reduce input data fetching, the amount of a neuron processed (i.e., computed) at the same time (i.e., the parallelism) in the accelerator can be increased. Less input data fetching allows more fetches of weight and can increase the processing throughput.

The weights for the neural network are learned during training. The weights are compressed and stored in memory offline. The accelerator is configured to fetch the weights from memory and decompress the weights for the processing. The weight decompression can be accomplished on the accelerator using a hardware mechanism to fetch weight data and perform decompression. After each weight fetch an address pointer corresponding to a weight storage location in memory can be incremented. The fetched compressed weights may be held in a buffer (e.g., 64 bits) having a buffer full level status register corresponding to the amount of bits available in the buffer. The compressed weights (e.g., 4-bit data) may be expanded (e.g., 8-bit data) through a programmable lookup table that is implemented in flip flops on the accelerator. Zero values are encoded as a single bit (e.g., "0") while non-zero weights are encoded with an additional header bit (e.g., "1"). The compression reduces memory and fetch requirements especially when the neural network is pruned heavily (e.g., 90% weights set to zero).

The accelerator reduces power consumption by processing multiple neurons at the same time while keeping the input data at the multipliers stable for multiple cycles. Holding the input data stable decreases the amount of toggling at the inputs of the multipliers. As a result, less power is consumed (i.e., less than if they were not held stable). The accelerator also reduces power consumption by performing multiple multiplications in parallel. This parallelism reduces the amount of clocking necessary for the accumulators. As a result, less power is consumed (i.e., less than without the added parallelism).

Figure 7:
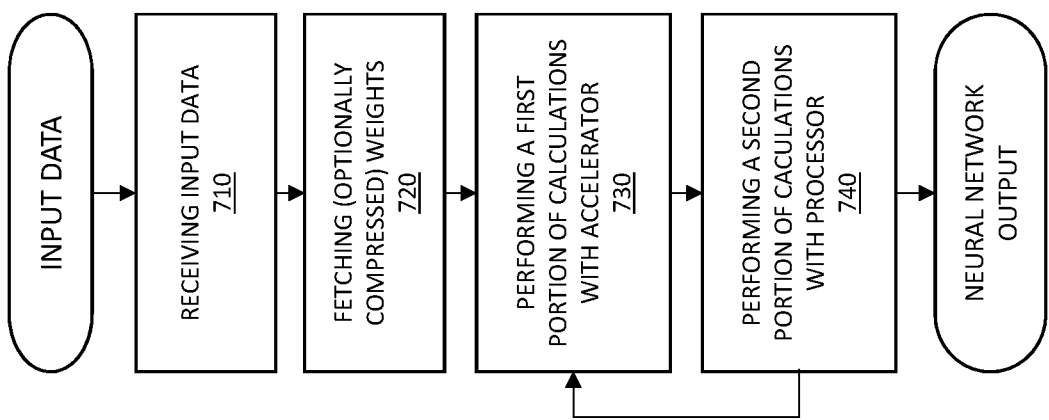
FIG. 7 is a flowchart of a method for implementing a neural network according to a possible implementation of the disclosure.

FIG. 7 is a flowchart of a method for implementing a neural network according to a possible implementation of the disclosure. In the method 700, input data are received. The input data may be data derived from a frame of audio data. For example, frames of audio data may be taken in sequence (e.g., every 10 milliseconds) and mathematically transformed into coefficients (e.g., MFCC) representative of the content of the audio data. The input data are received 710 for processing of the neural network. For example, a circular buffer of an accelerator can buffer an audio length on which the neural network is run (e.g., 0.4 seconds to 2 seconds). Additionally, compressed weights of the neural network, which are obtained from a previous training, may be fetched 720 from a memory and used for processing. For example, a buffer may hold the compressed weights (e.g., 64 bits) as part of the fetching operation, and the compressed weights may be decompressed (e.g., from 4-bits to 8-bits) prior to processing of the neural network. The neural network is processed using an accelerator and a processor. Accordingly, a first portion of processing for computing the neural network may be performed 730 by the accelerator, and a second portion of processing for computing the neural network may be performed 740 by the (host) processor. The first and second portions of the processing create output data (e.g., output layer values) for a set of input data. This process may be repeated (e.g., continuously repeated) as new input data are received (e.g., for streaming input data). Additionally, the output data may be analyzed (e.g., output layer values compared to thresholds) for recognition.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

The invention claimed is:

1. A method for implementing a neural network, the method comprising:

receiving input data;

fetching, from a memory, weights of the neural network;

performing a first portion of processing for the neural network, the first portion implemented in hardware by an accelerator including a plurality of parallel multiply and accumulate (MAC) units configured to perform a plurality of MAC operations to generate a first neuron value at a first accumulator and a second neuron value at a second accumulator, wherein the first portion includes:

receiving a first subset of the input data from a circular buffer at inputs of the plurality of parallel MAC units;

performing the plurality of parallel MAC operations using a first set of weights, while holding the inputs of the plurality of parallel MAC units stable at the first subset of the input data, to generate a first portion of the first neuron value at the first accumulator;

performing the plurality of parallel MAC operations using a second set of weights, while holding the inputs of the plurality of parallel MAC units stable at the first subset of the input data, to generate a second portion of the second neuron value at the second accumulator;

repeating receiving subsets of input data from the circular buffer and performing the plurality of parallel MAC operations while holding the inputs of the plurality of parallel MAC units stable to accumulate the first neuron value at the first accumulator and the second neuron value at the second accumulator for all input data;

selecting the first neuron value before a bias and an activation function is applied, using a multiplexer coupled to the plurality of parallel MAC units; and writing the first neuron value to the memory; and
performing a second portion of processing for the neural network, the second portion implemented in software by a processor, the accelerator and the processor using a bus to communicate and to share access to the memory, wherein the second portion includes:
reading the first neuron value from the memory; and
applying the bias and the activation function to the first neuron value.

2. The method according to claim 1, wherein the first set of weights and the second set of weights are compressed weights.

3. The method according to claim 2, wherein the first portion of processing includes decompressing the compressed weights using a lookup table to generate decompressed weights.

4. The method according to claim 3,
wherein:
the compressed weights are stored in the memory and are each 4 bits; and
the decompressed weights are used in the first portion of the processing of the neural network and are each 8 bits.

5. The method according to claim 4, wherein the compressed weights stored in the memory are pruned so that zero value weights are encoded as a single zero bit and non-zero value weights are encoded with a header bit of one.

6. The method according to claim 3, wherein the lookup table is implemented in software running on the processor and loaded into the accelerator.

7. The method according to claim 6, wherein the lookup table is implemented in hardware on the accelerator.

8. The method according to claim 2, wherein the first set of weights and the second set of weights include pruned weights and unpruned weights, the pruned weights including single bit representations of synapses and the unpruned weights including an additional bit.

9. The method according to claim 1, wherein the plurality of parallel multiply and accumulate operations are performed by a plurality of MAC units operating in parallel and repetitively to produce a sum of products corresponding to each neuron in the neural network.

10. The method according to claim 1, wherein the memory and the accelerator are part of a hearing aid.

\* \* \* \* \*